United States Patent Office 3,397,234
Patented Aug. 13, 1968

3,397,234
PROCESS FOR THE PREPARATION OF
α-PHENYL-N-METHYL NITRONE
Earl W. Cummins, Wilmington, Del., assignor to E. I. du Pont de Nemours and Company, Wilmington, Del., a corporation of Delaware
No Drawing. Continuation-in-part of application Ser. No. 375,946, June 17, 1964. This application Mar. 2, 1967, Ser. No. 619,965
11 Claims. (Cl. 260—566)

ABSTRACT OF THE DISCLOSURE

α-Phenyl-N-methyl nitrone is prepared by mixing an aqueous solution of N-methylhydroxylamine sulfate, bisulfate or chloride with benzaldehyde and then adding sodium or potassium hydroxide in amounts sufficient to maintain the pH of the aqueous phase between 1 and 6 and to attain a final stable pH between 4 and 6. Salting-out of the nitrone can be achieved by utilizing reactants at concentrations which will result in the final aqueous phase being approximately saturated with the by-product inorganic salt.

Related applications

This application is a continuation-in-part of my copending application, Ser. No. 375,946 filed June 17, 1964, now abandoned.

Background of invention

This invention relates to the reaction of N-methylhydroxylamine with benzaldehyde to form α-phenyl-N-methyl nitrone which is a valuable intermediate in the production of the halosubstituted phenylmethylmethoxyureas of U.S. Patent 2,960,534, issued Nov. 15, 1960, to Otto Scherer and Paul Heller.

In the prior art method of preparing α-phenyl-N-methyl nitrone, for example, U.S. Patent 3,178,467, column 5, lines 1 through 16, N-methylhydroxylamine as a dilute aqueous solution and benzaldehyde are reacted under strongly basic conditions. In the practice of this prior art method, caustic is added to the amine solution followed by addition of the benzaldehyde. Efficient cooling during the entire process is required because of the evolution of heat during the caustic addition and the reaction of the amine and benzaldehyde and because of the heat-sensitivity of N-methylhydroxylamine. The nitrone is isolated from the dilute, aqueous reaction mass by repeated solvent extractions.

In the process of my invention, the yield and cooling efficiency are greater than in the prior art process whereas the time and the reaction mass volume required to produce a given amount of nitrone are both significantly less. Furthermore, the isolation of the nitrone can be greatly simplified.

Process of this invention

This invention is directed to a process for the preparation of α-phenyl-N-methyl nitrone comprising maintaining the pH of the aqueous phase of a two phase system comprising benzaldehyde and an aqueous solution of N-methylhydroxylamine sulfate, bisulfate or chloride within the range of from 1 to 6 until reaction of the benzaldehyde and N-methylhydroxylamine substantially ceases, the pH being maintained between 1 and 6 by admixing sodium or potassium hydroxide with the mixture. This invention is also directed to a method of isolating α-phenyl-N-methyl nitrone from an aqueous solution thereof.

The mechanism by which this process is believed to proceed can best be understood by reference to the following:

(1) $[CH_3NH_2OH]^+_n X^{n-} + nH_2O \rightleftharpoons nCH_3NH_2OH + nH_3O^+ + X^{n-}$ (2) $nMOH + nH_3O^+ + X^{n-} \longrightarrow M_nX + 2nH_2O$

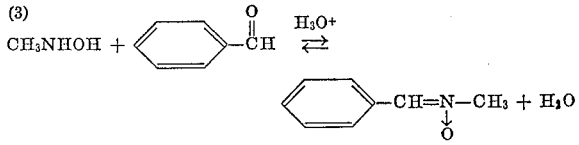

where X is $SO_4^=$, $HSO_4^-$ or $Cl^-$ and M is sodium or potassium.

The aqueous solution of a salt of N-methylhydroxylamine employed as a starting material in my process will usually have a pH of less than 1. Thus in equilibrium (1), the salt is originally predominant. When benzaldehyde is added to this solution essentially no reaction occurs. However, upon addition of an amount of base sufficient to raise the pH of the aqueous phase to within the range of from 1 to 6, Equation (2), a portion of the N-methylhydroxylamine is liberated from the salt and free N-methylhydroxylamine is available for the acid-catalyzed reaction with the benzaldehyde, (3). This reaction takes place rapidly under the acidic conditions which prevail. As the free N-methylhydroxylamine is consumed the pH of the aqueous phase decreases and additional base is added to maintain the pH between 1 and 6. To obtain maximum yields, addition of base is continued until the pH remains stable at a value within the range of from 4 to 6, preferably about 6.

The proper total amount of base added during the reaction is that stoichiometrically equivalent to the anion in the N-methylhydroxylamine salt. In practice, the N-methylhydroxylamine salt solution can contain free acid as other amine salts. In such cases, additional base is needed to release all of the N-methylhydroxylamine. The proper amount of base in all cases can be computed from analysis. Alternatively, the required amount of base can readily be determined by titrating a sample of the N-methylhydroxylamine salt solution starting material to pH 8.5 with standard base.

The appropriate rate for bsae addition is simply "as fast as one can add the base while keeping the pH in the range of 1 to 6, preferably 4 to 6." This rate will be quite fast at the beginning of the reaction and will slow down toward the end. If base is added so rapidly that the pH rises above 6, the acid-catalyzed reaction ceases because of the absence of sufficient acid. If the pH becomes too high, the pH is adjusted to the range of about 5 to 6 by the addition of a mineral acid such as sulfuric or hydrochloric.

The amount of benzaldehyde used is not critical. One to two moles of benzaldehyde per mole of the N-methylhydroxylamine salt is the preferred range. Amounts in excess of one mole per mole of the amine can be beneficial not only to accelerate the reaction by the well-known principle of mass action but also to aid the drying of the nitrone by distillation.

It is preferred for the benzaldehyde to be present in the reaction vessel before any N-methylhydroxylamine is freed from its salt and thus before addition of base is begun. It is preferred to make additions to the reaction vessel in the following order:

(a) benzaldehyde,
(b) aqueous solution of N-methylhydroxylamine salt, (c) water (if needed), and
(d) base with pH control.

The reaction of the base with the amine salt and the reaction of the free amine with the benzaldehyde are exothermic. It will ordinarily be preferred to carry out the process of this invention at a temperature somewhat above that of available cooling water to permit the most economic heat transfer. However, temperatures should be held below the boiling point of the reaction mixture. Temperatures higher than those used in the prior art process discussed above can be used because the N-methylhydroxylamine reacts with the benzaldehyde almost as rapidly as it is liberated from its salt and therefore, is exposed to high temperatures for a much shorter time than in the prior art process. I prefer a reaction temperature between 20 and 70° C. and find temperatures between 60 and 70° C. to be most preferable. In normal commercial operation, it is most convenient to initiate the reaction at ambient temperatures and allow the heats of reaction to raise the temperature to about 65° C. before applying external cooling to maintain the temperature between 60 and 70° C.

At the completion of the reaction the nitrone can easily be separated from the reaction mixture if the aqueous phase is saturated with a sulfate or chloride salt of sodium or potassium. If the aqueous phase is so saturated, the nitrone is "salted-out" into a separate organic layer which can be isolated from the remainder of the reaction mixture by decantation or other suitable methods. Solvents for the nitrone can, of course, be used at this stage but are unnecessary in the practice of this invention.

Saturation of the final aqueous phase with sodium or potassium sulfate or chloride can be accomplished either by utilizing aqueous N-methylhydroxylamine salt and base at concentrations which will yield a saturated aqueous phase when the reaction is complete or by adding sodium or potassium sulfate or chloride to the final reaction mixture. The salting-out effect can be observed at less than the saturation point of salt but yield losses occur and economy of the operation suffers. If the aqueous phase is beyond the saturation point, salt crystals can form. If this does occur the crystals can be allowed to settle prior to decantation of the nitrone or can be redissolved by adding water to the reaction mixture.

For best utilization of equipment, it is desirable that the aqueous phase contain a maximum quantity of the by-product salt. The temperature of maximum solubility for sodium sulfate is about 33° C. Accordingly, I prefer to cool the reaction mass to about 30 to 40° C. for phase separation. If sodium chloride is involved, the phase separation temperature is less critical and any convenient temperature in the range of 20 to 50° C. can be used.

The use of the sulfate salt of N-methylhydroxylamine and sodium hydroxide is preferred. Ordinarily, it is preferred to use 50% aqueous sodium hydroxide, this being a commercial article of convenience. In this case, the preferred concentration of the aqous N-methylhydroxylamine sulfate starting material is about 45% by weight. With these concentrations and materials, no additional water or salt is required to achieve saturation of the final aqueous phase with the by-product salt, sodium sulfate. Of course, if the N-methylhydroxylamine sulfate contains excess acid or other amine salts, slight adjustments in the amounts of sodium hydroxide and water can sometimes be necessary to give a final aqueous phase which is approximately saturated.

Concentrations of N-methylhydroxylamine sulfate above 45% can be used by simply adding sufficient water to the reactor to dilute to about 45%. By employing solid (100%) sodium hydroxide, N-methylhydroxylamine sulfate concentrations as low as 37.7% can be used with equivalent results, or, as described above, sodium sulfate can be added after completion of the reaction.

I prefer to use concentrations of N-methylhydroxylamine sulfate ranging from 38 to 75% and particularly prefer from 45 to 55% for ease of handling. Sodium hydroxide should not be more dilute than about 40% and as stated above, I greatly prefer 50%.

If the chloride or bisulfate salt of N-methylhydroxylamine is used, the reactant concentrations which will yield a saturated aqueous phase can be determined by simple calculations.

N-methylhydroxylamine sulfate solutions of preferred concentrations can be prepared by the method of U.S. Patent 3,173,953. Preferred amine bisulfate and chloride solutions can readily be prepared by simple modifications of this method or others described in the literature.

In a preferred process one admixes 45 to 46% aqueous N-methylhydroxylamine sulfate with one to two moles of benzaldehyde per mole of amine sulfate in an agitated reactor. One then adds 50% aqueous sodium hydroxide at a controlled rate which will adjust the pH of the aqueous phase to between 4 and 6 and maintain the pH within that range. The temperature increases as the addition of sodium hydroxide proceeds and when it reaches about 65° C. external cooling is applied. While maintaining the temperature between 60 and 70° C., the sodium hydroxide addition is continued until the pH remains stable at 6. The reaction mixture is then cooled to about 33° C., at which temperature the aqueous phase is saturated with respect to sodium sulfate. The α-phenyl-N-methyl nitrone exists primarily in a separate organic phase which is isolated from the aqueous phase by decantation. Although the nitrone is relatively soluble in pure water, the amount dissolved in the aqueous phase is only about 0.2%. The organic phase is comprised of 75% nitrone and 25% water. If an excess of benzaldehyde is employed the percentages of nitrone and water are correspondingly reduced.

If desired, the organic phase can be dried by distillation under reduced pressure to yield essentially anhydrous α-phenyl-N-methyl nitrone. The nitrone can be methylated and then cleaved by the addition of water to form N,O-dimethylhydroxylamine as described in U.S. Patent 3,178,467. This N,O-dimethylhydroxylamine can be reacted with a substituted phenyl isocyanate to obtain the compounds of the aforementioned Scherer and Heller patent.

In order to further explain this invention, the following additional examples are provided. All parts and percentages are by weight unless otherwise indicated.

EXAMPLE 1

Mix together 105 parts of a 45.7% aqueous N-methylhydroxylamine sulfate and 53 parts benzaldehyde in an agitated reactor. Add 50% aqueous sodium hydroxide gradually to the acidic mixture. Do not allow the pH of the aqueous phase to exceed 6. When the temperature reaches 65° C. apply external cooling to maintain the temperature at 60 to 70° C. The reaction is complete when the pH remains stable at 6 with no further addition of sodium hydroxide. If the pH should rise above 6 before the reaction is complete adjust it back to 5 with sulfuric acid and resume caustic feed.

Cool the mixture to 40° C. and separate the phases. Discard the aqueous (lower) phase. Dry the α-phenyl-N-methyl nitrone (upper) phase by distilling out the water at a pressure of 5 to 10 mm. mercury. Do not heat the nitrone over 100° C. The residue contains 97.6% nitrone and 0.08% water, corresponding to a yield of 98.1%.

EXAMPLE 2

Mix together 105 parts of acidic 45.7% aqueous N-methylhydroxylamine sulfate and 106 parts benzaldehyde in an agitated vessel. Warm the mixture to 65° C. Add 50% aqueous sodium hydroxide to the mixture as described in Example 1 until a stable pH of 6 is reached. Keep the temperature at 65° C. during the caustic addition. Cooling will be required.

Cool the mixture to 40° C. and draw off the aqueous (lower) phase. Dry the nitrone (upper) phase by distilling off the water at a pot temperature of 90° C. under partial vacuum. The residue contains less than 0.05% water. Analysis by ultraviolet absorption shows a nitrone yield of greater than 98%.

EXAMPLE 3

Repeat Example 2 but substitute 125 parts of 38.4% aqueous N-methylhydroxylamine sulfate for the 105 parts of 45.7% aqueous N-methylhydroxylamine sulfate and when the pH is stable at 6, add 10 parts of solid sodium sulfate (salt cake) to the reaction mixture. Essentially identical results are obtained.

EXAMPLE 4

Mix together 92.8 parts of 45% aqueous N-methylhydroxylamine chloride and 106 parts benzaldehyde in an agitated vessel. Warm the mixture to 65° C. Add 50% aqueous sodium hydroxide to the mixture as described in Example 1 until a stable pH of 6 is reached. Keep the temperature at 65° C. during the caustic addition. Cooling will be required.

Cool the mixture to 40° C. Solid sodium chloride will be present in the reaction mixture. Add water until solid sodium chloride is no longer present. Approximately 30 parts of water will be required. Separate the phases and dry the nitrone as described in Example 1. A good yield of the nitrone will result.

EXAMPLE 5

A batch of α-phenyl-N-methyl nitrone is prepared as described below, methylated with dimethylsulfate and the resulting product cleaved by the addition of water to form N,O-dimethylhydroxylamine, benzaldehyde and methyl hydrogen sulfate. These products are separated and the benzaldehyde, along with that removed during the nitrone drying operation, are used in the following example.

A stirred reactor is charged with 9 pounds of fresh benzaldehyde and 360 pounds of benzaldehyde obtained as described above, 85 pounds of water and 304 pounds of a 54.9% aqueous solution of N-methylhydroxylamine sulfate which also contains 4 pounds of sulfuric acid and 3 pounds of methylamine sulfate. Aqueous 50% sodium hydroxide is added to the resulting slurry. When the temperature reaches 65° C., external cooling is applied to maintain this temperature. The addition of sodium hydroxide is continued until a stable pH of 6 is obtained. This requires 146 pounds of the aqueous sodium hydroxide. The reaction mass is cooled to 35° C. and the lower aqueous layer is discarded. This phase contains essentially all the methylamine sulfate originally present. The upper nitrone-benzaldehyde phase is dried at a pot temperature of 90° C. under partial vacuum until a total of 76 pounds of distillate is obtained. The resulting residue contains less than 0.05% water. The yield of nitrone is 98.7% of theoretical as determined by ultraviolet analysis.

The products prepared in the preceding examples are admirably suited for conversion to N,O-dimethylhydroxylamine.

What is claimed is:

1. A process for preparing α-phenyl-N-methyl nitrone comprising maintaining the pH of the aqueous phase of a two phase mixture comprising benzaldehyde and an aqueous solution of the sulfate, bisulfate or chloride salt of N-methylhydroxylamine within the range of 1 to 6 until reaction of said benzaldehyde and N-methylhydroxylamine is substantially complete, the pH being maintained within said range by admixing sodium hydroxide or potassium hydroxide with said mixture.

2. The process of claim 1 wherein said mixture is maintained at a temperature of from 20 to 70° C.

3. The process of claim 1 wherein said mixture is maintained at a temperature of from 60 to 70° C.

4. The process of claim 1 wherein the benzaldhyde: N-methylhydroxylamine salt mole ratio is from 1:1 to 2:1.

5. The process of claim 1 wherein said pH is maintained within the range of from 4 to 6.

6. The process of claim 1 wherein the final pH is within the range of from 4 to 6.

7. The process of claim 6 wherein the reactant concentrations are such that upon completion of said reaction, said aqueous phase is substantially saturated with the sulfate or chloride salt of sodium or potassium.

8. A process for preparing α-phenyl-N-methyl nitrone comprising adding sodium hydroxide to a two phase mixture comprising an aqueous solution of the sulfate, bisulfate or chloride salt of N-methylhydroxylamine and from 1 to 2 moles of benzaldehyde per mole of said salt in amounts sufficient to maintain the pH of the aqueous phase of said two phase mixture within the range of from 1 to 6 and to adjust said aqueous phase to a stable pH within the range of from 4 to 6.

9. The process of claim 8 wherein the concentration of said sodium hydroxide and said salt are such that the final aqueous phase is saturated with sodium sulfate or sodium chloride.

10. The process of claim 9 wherein the temperature of said mixture is maintained within the range of from 60 to 70° C.

11. A method of isolating α-phenyl-N-methyl nitrone from an aqueous solution thereof comprising saturating said solution with a sulfate or chloride salt of sodium or potassium.

References Cited

UNITED STATES PATENTS 3,178,467    4/1965    Gerjovich et al. _____ 260—566

CHARLES B. PARKER, *Primary Examiner.*

R. V. HINES, *Assistant Examiner.*